3,067,181
POLYMERIZATION PROCESS FOR VINYL CYANIDES

Rudolph W. Kluiber, Bernardsville, N.J., assignor to Union Carbide Corporation, a corporation of New York
No Drawing. Filed Dec. 30, 1959, Ser. No. 862,807
9 Claims. (Cl. 260—85.5)

This invention relates to a polymerization process and, more particularly, to the polymerization of vinyl cyanides such as acrylonitrile.

It is well known in the art that the polymerization of vinyl cyanides, particularly acrylonitrile, is to a considerable degree inhibited by the presence in the reaction system of relatively small amounts of dissolved oxygen or amines. In the presence of these inhibitors, even vigorous polymerization initiators such as organic peroxides fail to bring about rapid polymerization. The problems incurred by the presence of these oxygen and amine inhibitors is, moreover, more serious because of the difficulty encountered in attempting to exclude them from the reaction system. Oxygen is of course always present whenever polymerization is conducted in a system open to the atmosphere. Amines are perhaps even more difficult to exclude than oxygen since they are frequently carried into the system as impurities in other additives.

In some instances otherwise desirable additives, such as dyes, may themselves be amines. Heretofore in such circumstances either the inhibiting effect of the amine was partially balanced by the addition of strong polymerization catalysts which exerted a destructive effect upon the amine additive itself, or protracted and expensive polymerization periods were necessarily employed.

It is therefore the general object of the present invention to provide a process for polymerizing vinyl cyanides in which the presence of oxygen and/or amine impurities does not appreciably inhibit the rate of polymerization.

This general object and other particular objects which will be obvious from the specification and claims are accomplished in accordance with the present invention by carrying out the polymerization of monomeric vinyl cyanides in the presence of a small amount of a copper chelate complex of a $\beta$-dicarbonyl compound.

The class of vinyl cyanide monomers advantageously homopolymerized according to the process of the present invention includes acrylonitrile, which is the preferred species, and the $\alpha$ mono-substituted derivatives thereof, i.e., those derivatives which correspond to the general formula:

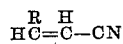

wherein R is hydrogen or a monovalent hydrocarbon radical. Preferably R is an alkyl group, especially an alkyl group containing from 1 to 3 carbon atoms inclusive.

Specifically illustrative of these homopolymerizable vinyl cyanide monomers, but in no way limitative thereof, are acrylonitrile, $\alpha$-methyl acrylonitrile, $\alpha$-ethyl acrylonitrile, $\alpha$-n-propyl acrylonitrile, $\alpha$-phenyl acrylonitrile, $\alpha$-cyclo-hexyl acrylonitrile, $\alpha$-fururyl acrylonitrile, $\alpha$-isopropyl acrylonitrile, $\alpha$-xylyl acrylonitrile, and the like.

In addition to preparing homopolymers of the compounds set forth above, copolymers can also be readily prepared according to the present process by using mixtures of these compounds in all proportions. Additional copolymers can also be prepared by employing a major proportion, i.e., at least 50 percent by weight of acrylonitrile or an $\alpha$-substituted derivative thereof in combination with other polymerizable vinyl monomeric compounds, such as styrene, acrylic acid esters and $\beta$-substituted acrylonitriles. In forming copolymers, the $\beta$-substituted acrylonitrile compounds preferred have the general formula

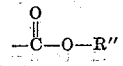

wherein R is a monovalent hydrocarbon radical or a carbalkoxy group having the general formula $$-\overset{O}{\underset{\|}{C}}-O-R''$$

wherein R'' is an alkyl group containing from 1 to 4 carbon atoms.

Specifically illustrative of the $\beta$-substituted acrylonitriles which in minor proportion are copolymerizable with acrylonitrile and/or one or more of the $\alpha$-mono-substituted derivatives thereof, are $\beta$-methyl acrylonitrile; ethyl cis-$\beta$ cyanoacrylate; $\beta$-phenyl acrylonitrile; $\beta$-cyanoacrylate; 1-cyano-2-methylbutadiene-1,3; $\beta$-cyclohexyl acrylonitrile; and the like. By the term $\beta$-mono-substituted acrylonitrile is meant acrylonitrile substituted by a single monovalent group on the carbon atom $\beta$ to the cyano radical.

The copper chelate compounds which are suitable catalysts in the present process are represented by the general formula:

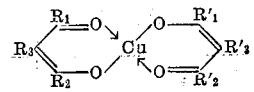

wherein $R_1$, $R'_1$, $R_2$, and $R'_2$ are each selected from the group consisting of alkyl, aryl, aralkyl, alkaryl, aryloxy, and alkoxy groups, and $R_3$ and $R'_3$ are each selected from the group consisting of hydrogen, halogen and a monovalent hydrocarbon radical, and an alkylcarbalkoxy radical having the general formula $$-(CH_2)_n-COOR''$$

wherein R'' is a monovalent hydrocarbon radical and $n$ is an integer having a value of from 1 to 6.

Preferred in the practice of this invention are those copper chelates corresponding to the general formula above wherein $R_1$, $R'_1$, $R_2$ and $R'_2$ are each alkyl groups, especially methyl, and $R_3$ and $R'_3$ are each halogen, alkyl, aryl or alkylcarbalkoxy groups.

Although copper chelate compounds which correspond to the general formula above are effective as catalysts for polymerizing vinyl cyanide monomers, not all combinations of R— group substituents endow the chelate complex with the same degree of catalytic activity. The relative catalytic activity of the chelates coming within the scope of the present invention may be determined by a qualitative empirical evaluation of the rate of decomposition of the chelate compound to form $Cu_2O$ in a mineral oil medium and in the substantial absence of oxygen. This empirical rate of decomposition is determined according to the following procedure:

In a 3 milliliter test tube 0.1 millimole of the copper chelate to be tested is dissolved in 2.0 milliliters of pharmaceutical grade mineral oil. The air in the remaining space in the tube is replaced by purging with nitrogen and the tube is provided with a suitable stopper for preventing the re-entrance of atmospheric oxygen. The tube and contents are then heated so that the temperature is quickly raised to 190° C. and then is maintained constant until a distinct hazy or cloudy appearance develops in the tube due to the formation of $Cu_2O$ particles. The time in minutes required for the development of the haze is proportional to the catalytic activity of the copper chelate compound. The activity of the copper acetylacetonate which has the formula

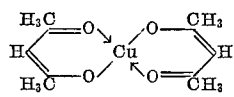

is the standard selected for comparison. The product of 100 times the quotient of the time in minutes required for the development of the $Cu_2O$ haze in mineral oil divided by the time in minutes required for haze development in the case of the standard is identified as the Oil Haze Number of the copper chelate tested. The lower the Oil Haze Number, the more active the copper chelate catalyst. Preferred catalysts are those which have an Oil Haze Number of 100 or less. The definition here assigned the term Oil Haze Number is intended to apply in each instance of occurrence of the term throughout the specification and the appended claims.

In Table I below the relative activity of a number of copper chelate compounds are shown, both with reference to the time required to polymerize acrylonitrile at 25° C. and the time required for haze formation in mineral oil. The concentration of copper chelate catalyst in the acrylonitrile monomer was 0.002 g./ml. $R_1$, $R'_1$, $R_2$, $R'_2$, $R_3$ and $R'_3$ employed as column headings in the table refer to the corresponding substituent groups in the general structural formula:

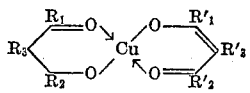

TABLE I

| $R_1$—$R'_1$ | $R_2$—$R'_2$ | $R_3$—$R'_3$ | Time (min.) to decompose to $Cu_2O$ in mineral oil at 190° C. | Time required to polymerize acrylonitrile at 25° C. |
|---|---|---|---|---|
| Methyl | Methyl | Methyl | 2 | <24 hrs. |
| Do | do | Ethyl | 3 | <24 hrs. |
| Do | do | —$(CH_2)_2\overset{O}{\overset{\|}{C}}$O Et | 3 | <24 hrs. |
| Do | Ethoxy | Hydrogen | 4 | <24 hrs. |
| Do | Methyl | Chlorine | 8 | <48 hrs. |
| Do | do | Bromine | 8 | <24 hrs. |
| Do | do | Phenyl | 15 | <24 hrs. |
| Do | do | Hydrogen | 35 | ~3 wks. |
| n-Propyl | do | do | 35 | ~3 wks. |
| Phenyl | do | do | 35 | ~3 wks. |

The process of the present invention may be carried out in bulk, in an inert organic solvent medium such as benzene, toluene, petroleum ether or in the presence of water with equal facility. In each of these systems the concentration of the copper chelate is by no means narrowly critical although a concentration of from about 0.5 mg. to about 5 mg. of the chelate per gram of vinyl cyanide monomer is preferred because of better yields obtained. The use of lesser amounts necessitates longer polymerization periods, and greater amounts, while not harmful to the process, impart slight color to the final product.

The copper chelate catalysts of the present invention may be prepared according to any of several methods well known in the art and using a variety of starting materials. Suitable methods of preparation described in the literature include the method of A. Combes, Compt. rend. 111, 273; and Kelso, Greenlee et al., J. Am. Chem. Soc., 77, 1751 (1955).

In order to illustrate the invention, the following specific examples are given.

*Example I*

The copper chelate of ethyl-5-keto-4-acetylcaproate was prepared according to the following general procedure using pentane-2,4-dione; ethyl acrylate; and copper sulfate as reactants. Metallic sodium (12 grams, 0.52 mole) was dissolved in approximately 250 ml. of commercial absolute ethanol in a 500 ml. three-necked flask equipped with a stirrer and a dropping funnel. Pentane-2,4-dione (100 g. 1.0 mole) was added to the stirred sodium ethoxide solution cooled by an ice-bath. Ethyl acrylate (50 g., 0.5 mole) was added drop-wise with stirring to the cooled reaction mixture, and the stirring was continued approximately 16 hours at room temperature. The reaction was quenched with an excess of glacial acetic acid and the clear solution (pH 4–5) was evaporated under reduced pressure (20 mm. Hg). The semi-solid residue was treated with 20 ml. of water and extracted with four 100 mm. portions of ether. After drying the extracts over anhydrous magnesium sulfate, the ether was removed under reduced pressure (20 mm. Hg) and the residual product distilled, yielding 83 g. (83 percent) of a light, yellow liquid, B.P. 124–128° (3 mm.). The diketo ester was then shaken overnight with an equimolar quantity of copper sulfate in aqueous ammoniacal solution. The precipitated copper chelate was removed by filtration and crystallized from benzene-petroleum ether.

*Example II*

A series of reactions in which acrylonitrile was polymerized in the presence of the copper chelate prepared in Example I was carried out using different concentrations of the copper chelate catalyst. In each reaction 4 grams of a commercial grade of monomeric acrylonitrile was placed in a stoppered test tube and admixed with a small quantity of the chelate catalyst. The test tubes were then maintained at 25±2° C. for a period of 24 hours. At the end of this period the polyacrylonitrile formed was removed from the pasty mixture in the tube by the addition of petroleum ether and subsequent filtration. As a control, one tube containing only the commercial acrylonitrile monomer was treated in the same manner as those containing the catalyst. The results of the polymerization reactions and catalyst concentration data is shown in Table II below:

TABLE II

| Catalyst concentration in mg./4 grams acrylonitrile | Polymer yield in mg. | Reduced viscosity at 25° C. of polymer (40 mg./10 ml. dimethylformamide) |
|---|---|---|
| 0.0 | 0.0 | |
| 1.4 | 1.9 | |
| 2.8 | 3.5 | |
| 8.0 | 193.0 | 5.67 |
| 20.0 | 632.0 | 3.58 |
| 40.0 | 511.0 | 2.74 |

*Example III*

The catalytic activity of the copper chelate of ethyl-5-keto-4-acetylcaproate on monomeric acrylonitrile in the absence of any inhibitors was determined by the same bulk procedure as followed in Example II. The monomer was purified, however, in this experiment by passing it through granular alumina. After 24 hours at 25±2° C., 834 mg. of polyacrylonitrile had formed from an initial quantity of monomer of 4 grams, 20 mg. of chelate catalyst being employed.

*Example IV*

A copper chelate was prepared by the reaction of methyl iodide with acetylacetone in the presence of sodium methoxide and subsequent chelation with ammoniacal copper sulfate according to the method of Kelso, et al., J.A.C.S., 77, 1751 (1955). The chelate thus formed has the following structure:

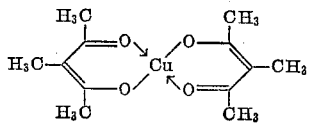

This copper chelate was used to catalyze the copolymerization of ethyl cis-β-cyanoacrylate with methyl acrylate. Equal volumes (½ ml.) of the two monomers were admixed in a test tube and the copper chelate in a concentration of 10 mg. per ml. of the monomer mixture was added. The reactants were maintained at a temperature of 25° C.±2 for a period of 48 hours. At the end of this period the solid copolymer was isolated by precipitation with methanol. Yield, 100 mg. of polymer having a reduced viscosity at 25° C. in dimethylformamide of 0.42. Infrared analysis indicated that the copolymer contained about 10 percent by weight of the ethyl cis-β-cyanoacrylate.

*Example V*

POLYMERIZATION OF ACRYLONITRILE IN THE PRESENCE OF WATER

A polymerization mixture consisting of 1 part of acrylonitrile and 1 part of water is prepared. 5 mg. of Copper II, 3 methylacetylacetonate per ml. of solution is added and the mixture vigorously shaken for 20 hours. The precipitated polyacrylonitrile is collected by suction filtration and dried.

*Example VI*

The effectiveness of the process of the present invention when carried out at a very low temperature was demonstrated by admixing 10 mg. of the copper chelate prepared in Example IV with 1 ml. of acrylonitrile monomer and maintaining the mixture at −20° C. for approximately 2 weeks. Although a large percentage of the catalyst crystallized under these conditions, 200 mg. of a solid polymer was formed at the end of this period. The polymer showed no crystallinity under examination by X-ray diffraction, and had a reduced viscosity in dimethylformamide (0.4 g./100 ml. at 25° C.) of 5.42.

*Example VII*

Mixtures containing various volume ratios of styrene to acrylonitrile were polymerized at 25° C. in the presence of the copper chelate catalyst prepared in Example I. The pertinent data are set forth in Table III below.

TABLE III

| Vol. (ml) of monomers | | Polymerization time, hrs. | Yield polymer in grams | Percent N in polymer | Reduced viscosity [1] |
| --- | --- | --- | --- | --- | --- |
| Styrene | Acrylonitrile | | | | |
| 60 | 40 | 5½ | 0.5 | 7.18 | 1.97 |
| 50 | 50 | 5½ | 1.5 | 8.00 | 1.50 |
| 25 | 75 | 2½ | 1.4 | 9.81 | 1.07 |

[1] 0.2 gram polymer/100 ml. dimethylformamide at 25° C.

Monomer reactivity ratios were calculated and were identical within experimental error to the accepted values for free radical polymerization of styrene and acrylonitrile.

Temperatures of polymerization may vary widely and are determined solely by considerations pertinent to the monomers, which considerations are well known in the art. Thus although temperatures in the range of 0° C. to 50° C. are applicable generally to the vinyl cyanide compounds of the instant invention and are therefore preferred, in certain instances, as will be readily appreciated by those skilled in the art, temperatures as high as 150° C. and as low as −20° C. may be employed without destroying the effectiveness of the copper chelate catalysts.

What is claimed is:

1. The polymerization process which comprises contacting a vinyl cyanide monomer having the general formula:

$$\text{HC}=\overset{R}{\underset{}{C}}-\text{CN}$$

wherein R is a member selected from the group consisting of hydrogen and a monovalent hydrocarbon radical, under polymerization condition with a catalytic amount of a copper chelate compound having the general formula:

wherein $R_1$, $R_2$, $R'_1$, and $R'_2$ are each selected from the group consisting of alkyl, aryl, aralkyl, alkaryl, aryloxy, and alkoxy groups, and $R_3$ and $R'_3$ are each selected from the group consisting of hydrogen, halogen, a monovalent hydrocarbon radical, and an alkylcarbalkoxy radical having the general formula:

$$-(CH_2)_n-COOR''$$

wherein $R''$ is a monovalent hydrocarbon radical and $n$ is an integer having a value of from 1 to 6 said copper chelate being the sole catalyst present.

2. The process according to claim 1 wherein the vinyl cyanide monomer is acrylonitrile.

3. The process according to claim 1 wherein the vinyl cyanide monomer is α-methyl acrylonitrile.

4. The polymerization process according to claim 1 in which the monomeric vinyl cyanide is contacted at a temperature in the range of from about 0° C. to about 50° C. with a copper chelate in an amount of from about 0.5 to about 5.0 parts by weight per 1000 parts by weight of said vinyl cyanide monomer, said copper chelate having the general formula:

wherein $R_1$, $R_2$, $R'_1$ and $R'_2$ are each selected from the group consisting of alkyl, aryl, aralkyl, alkaryl, aryloxy, and alkoxy groups and $R_3$ and $R'_3$ are each selected from the group consisting of hydrogen, halogen, a monovalent hydrocarbon radical, and an alkylcarbalkoxy radical having the general formula $$-(CH_2)_n-COOR''$$

wherein $R''$ is a monovalent hydrocarbon radical and $n$ is an integer having a value of from 1 to 6.

5. The process according to claim 4 wherein the vinyl cyanide monomer is contacted by the copper chelate compound in an inert organic liquid medium.

6. The process according to claim 4 wherein the copper chelate compound has the general formula wherein $R_1$, $R_2$, $R_3$, $R'_1$, $R'_2$, and $R'_3$ are each alkyl groups.

7. The process according to claim 6 wherein $R_1$, $R_2$, $R_3$, $R'_1$, $R'_2$, and $R'_3$ are each methyl groups.

8. The polymerization process which includes the step of contacting a mixture of vinyl cyanide monomers comprising a major weight proportion of at least one monomeric compound having the general formula:

$$\text{HC}=\overset{R}{\underset{}{C}}-\text{CN}$$

wherein R is a member selected from the group consisting of hydrogen and a monovalent hydrocarbon radical, and a minor weight proportion of a β-monosubstituted acrylonitrile under polymerization conditions with a catalytic amount of a copper chelate compound having the general formula wherein $R_1$, $R_2$, $R'_1$, and $R'_2$ are each selected from the group consisting of alkyl, aryl, aralkyl, alkaryl, aryloxy and alkoxy groups, and $R_3$ and $R'_3$ are each selected from the group consisting of hydrogen, halogen, a monovalent hydrocarbon radical, and an alkylcarbalkoxy radical having the general formula $$-(CH_2)_n-COOR''$$

wherein R'' is an alkyl group containing from 1 to 4 carbon atoms inclusive said copper chelate being the sole catalyst present.

9. The polymerization process which includes the step of contacting a mixture of vinyl cyanide monomers comprising a major proportion of at least one monomeric compound having the general formula:

$$\overset{H}{H}\overset{R}{C}=\overset{}{C}-CN$$

wherein R is a member selected from the group consisting of hydrogen and a monovalent hydrocarbon radical, and a minor proportion of styrene under polymerization conditions with a catalytic amount of a copper chelate compound having the general formula

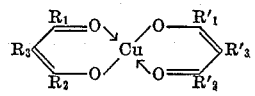

wherein $R_1$, $R_2$, $R'_1$, and $R'_2$ are each selected from the group consisting of alkyl, aryl, aralkyl, alkaryl, aryloxy and alkoxy groups, and $R_3$ and $R'_3$ are each selected from the group consisting of hydrogen, halogen, a monovalent hydrocarbon radical, and an alkylcarbalkoxy radical having the general formula $$-(CH_2)_n-COOR''$$

wherein R'' is an alkyl group containing from 1 to 4 carbon atoms inclusive said copper chelate being the sole catalyst present.

References Cited in the file of this patent

UNITED STATES PATENTS

| | | |
|---|---|---|
| 2,208,253 | Flenner et al. | July 16, 1940 |
| 2,388,372 | Stewart | Nov. 6, 1945 |
| 2,612,490 | Gould | Sept. 30, 1952 |
| 2,873,263 | Lal | Feb. 10, 1959 |

FOREIGN PATENTS

| | | |
|---|---|---|
| 289,493 | Great Britain | Apr. 30, 1928 |